United States Patent
Motoyama

(10) Patent No.: US 7,613,549 B1
(45) Date of Patent: Nov. 3, 2009

(54) APPROACH FOR MANAGING POWER CONSUMPTION IN BUILDINGS

(75) Inventor: Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 801 days.

(21) Appl. No.: 11/104,198

(22) Filed: Apr. 11, 2005

Related U.S. Application Data

(63) Continuation of application No. 10/863,310, filed on Jun. 7, 2004, now Pat. No. 6,879,883.

(51) Int. Cl.
*G05D 11/00* (2006.01)

(52) U.S. Cl. ............... 700/295; 700/286; 700/291; 700/297; 340/825.49

(58) Field of Classification Search ........... 700/286, 700/291, 295–297; 340/509, 3.1, 524, 526, 340/825.49; 713/300, 320, 324, 340
See application file for complete search history.

(56) References Cited

U.S. PATENT DOCUMENTS

| | | | |
|---|---|---|---|
| 5,086,385 A | 2/1992 | Launey et al. | |
| 5,156,203 A | 10/1992 | Funakoshi et al. | |
| 5,305,952 A | 4/1994 | Hannarong | |
| 5,682,949 A | 11/1997 | Ratcliffe et al. | |
| 5,900,026 A | 5/1999 | Ryu | |
| 5,962,989 A | 10/1999 | Baker | |
| 6,260,111 B1 | 7/2001 | Craig et al. | |
| 6,263,260 B1 | 7/2001 | Bodmer et al. | |
| 6,297,746 B1 | 10/2001 | Nakazawa et al. | |
| 6,348,867 B1 | 2/2002 | Myllymäki | |
| 6,349,883 B1 | 2/2002 | Simmons et al. | |
| 6,408,395 B1 | 6/2002 | Sugahara et al. | |
| 6,415,387 B1 | 7/2002 | Aguilar et al. | |
| 6,594,767 B1 | 7/2003 | Wiley et al. | |

(Continued)

FOREIGN PATENT DOCUMENTS

| | | |
|---|---|---|
| EP | 0 838 791 A2 | 4/1998 |
| GB | 2 194 088 A | 2/1988 |
| JP | 03-182965 | 8/1991 |
| JP | 2001-242967 | 9/2001 |
| WO | WO 02/13218 A1 | 2/2002 |

OTHER PUBLICATIONS

Itoh International Patent Office, "Office Action", Japanese Patent application No. 2003-194831, received Sep. 25, 2008, 3 pages.
Claims, Japanese Patent application No. 2003-194831, 4 pages.

*Primary Examiner*—Kidest Bahta
*Assistant Examiner*—Nathan Laughlin
(74) *Attorney, Agent, or Firm*—Hickman Palermo Truong & Becker LLP; Edward A. Becker

(57) ABSTRACT

An approach for managing power consumption in a building includes receiving a signal that indicates that a user has entered or left the building. In response to receiving the signal, one or more resources in the building are transitioned between a first state and a second state. When operating in the first state, the one or more resources consume relatively less power relative to when the one or more resources are operating in the second state. A determination may also be made, based upon the signal and status data, whether the user has entered the building or left the building. If the user has entered the building, then the one or more resources are transitioned from the first state to the second state. If the user has left the building, then the one or more resources are transitioned from the second state to the first state.

27 Claims, 6 Drawing Sheets

U.S. PATENT DOCUMENTS

| | | |
|---|---|---|
| 6,642,843 B2 | 11/2003 | Satoh |
| 6,715,088 B1 | 3/2004 | Togawa |
| 6,789,208 B2 | 9/2004 | Noda et al. |
| 6,867,699 B2 * | 3/2005 | Curwen et al. ............ 340/573.4 |
| 6,870,477 B2 * | 3/2005 | Gruteser et al. .......... 340/573.1 |
| 6,909,367 B1 * | 6/2005 | Wetmore ................ 340/539.21 |
| 7,209,805 B2 * | 4/2007 | Motoyama .................. 700/286 |
| 2002/0010854 A1 | 1/2002 | Ogura et al. |
| 2003/0171851 A1 | 9/2003 | Brickfield et al. |
| 2005/0204177 A1 | 9/2005 | Watts et al. |

* cited by examiner

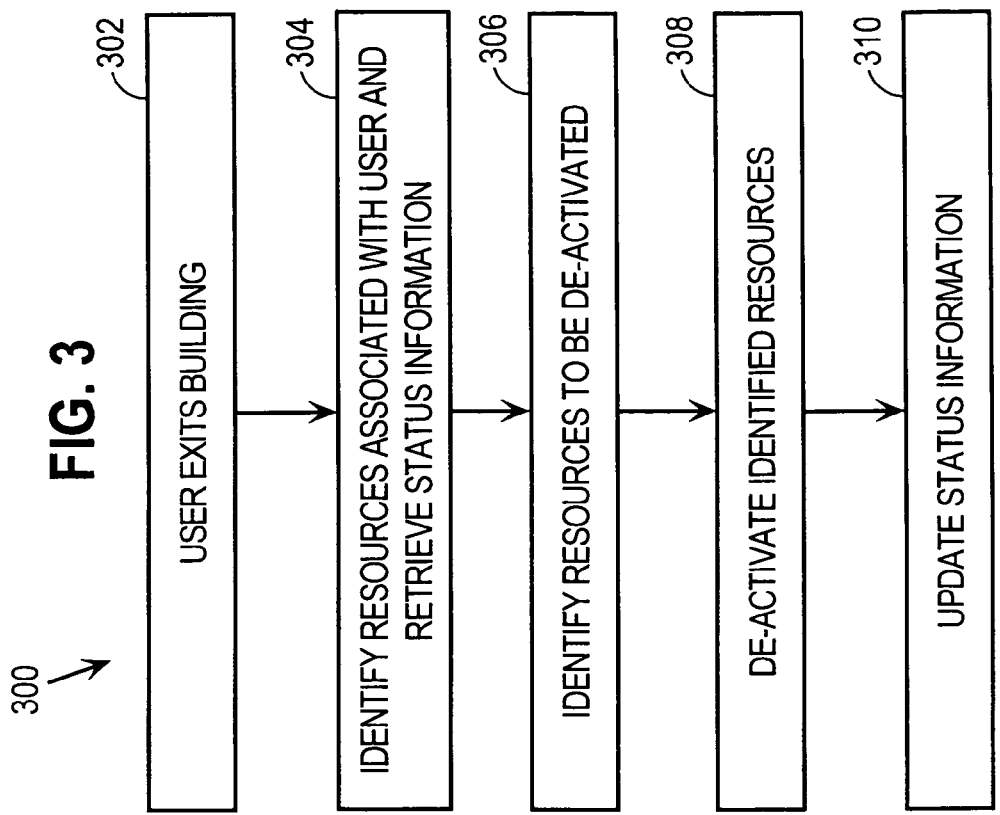
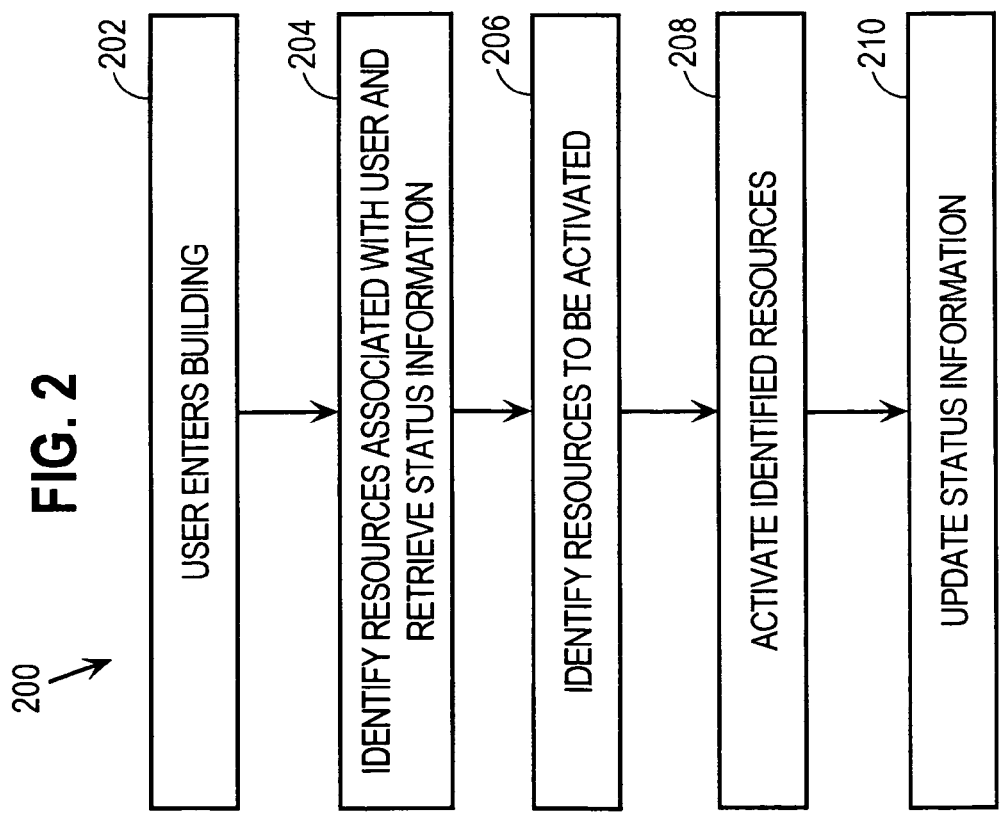

| ID (600) | VECTOR OF LIGHT (602) |
|---|---|
|  |  |
|  |  |
|  |  |
|  |  |

| ID (604) | VECTOR OF PERIPHERALS (606) |
|---|---|
|  |  |
|  |  |
|  |  |
|  |  |

| ID (608) | VECTOR OF PCS & STATUS (610) | USER STATUS (612) | DEPARTMENT (614) |
|---|---|---|---|
|  |  |  |  |
|  |  |  |  |
|  |  |  |  |
|  |  |  |  |

| DEPT (702) | VECTOR OF LIGHT (704) | VECTOR OF IDs (706) |
|---|---|---|
| | | |
| | | |
| | | |
| | | |

| DEPT (710) | VECTOR OF PERIPHERALS (712) | VECTOR OF IDs (714) |
|---|---|---|
| | | |
| | | |
| | | |
| | | |

APPROACH FOR MANAGING POWER CONSUMPTION IN BUILDINGS

RELATED APPLICATIONS AND CLAIM OF PRIORITY

This application is a continuation of and claims priority to U.S. patent application Ser. No. 10/863,310 entitled APPROACH FOR MANAGING POWER CONSUMPTION IN BUILDINGS, filed on Jun. 7, 2004, now U.S. Pat. No. 6,879,883 the contents of which is hereby incorporated by reference in its entirety.

This application is related to U.S. patent application Ser. No. 10/894,578 entitled APPROACH FOR MANAGING POWER CONSUMPTION OF NETWORK DEVICES, filed on Jul. 19, 2004, which is a continuation of and claims priority to U.S. patent application Ser. No. 10/371,379, now issued as U.S. Pat. No. 6,766,223, entitled APPROACH FOR MANAGING POWER CONSUMPTION OF NETWORK DEVICES, filed on Feb. 20, 2003, which is a continuation-in-part of and claims priority to U.S. patent application Ser. No. 10/245,935, now issued as U.S. Pat. No. 6,748,299, entitled APPROACH FOR MANAGING POWER CONSUMPTION IN BUILDINGS, filed on Sep. 17, 2002.

This application is related to U.S. patent application Ser. No. 10/938,306 entitled PRE-ACTIVATION OF NETWORK DEVICES, filed on Sep. 10, 2004.

FIELD OF THE INVENTION

The invention relates to power conservation generally, and more specifically, to an approach for managing power consumption in buildings.

BACKGROUND OF THE INVENTION

Reducing power consumption has become an important issue for businesses because of environmental concerns and the rising costs of electricity. Corporations have made significant progress in reducing power consumption through employee education programs that encourage employees to turn off their lights and personal computers when they leave work each day. The success of this approach depends upon the diligence of employees in turning off lights, computers and other equipment when not in use. Some types of equipment take a long time to power up from a powered down state. For example, it is not uncommon for personal computers to require several minutes to "boot up." Other types of equipment, such as copy machines and laboratory instruments, can require even more time to complete a power up cycle. These delays can have an adverse effect on productivity in situations where large numbers of employees are waiting for equipment to power up. As a result of these long delays, many employees leave equipment on all the time.

Another approach has been to configure certain types of equipment, such as personal computers, with a power saving mode of operation. A power saving mode is an operating mode in which a device consumes less power, typically by shutting down one or more subsystems. For example, personal computers typically shut down the hard disk and monitor in a power saving mode. A personal computer typically enters a power saving mode after a specified amount of time has passed without any keyboard or mouse activity. When keyboard or mouse activity resumes, power is restored to all components and the personal computer returns to the regular power state. One drawback of this approach is that the PC stills consumes power in the power saving mode, albeit at a reduced rate. Furthermore, the transition from power saving mode to regular operating mode can require several seconds or more, depending upon the particular implementation. Another drawback of this approach is that many older computers and other types of equipment are not configured with power saving modes of operation.

Based on the need to conserve power in buildings and the limitations in prior approaches, an approach for managing power consumption in buildings that does not suffer from the limitations of prior approaches is highly desirable.

SUMMARY OF THE INVENTION

According to one aspect of the invention, an approach is provided for managing power consumption in a building. According to the approach, a signal is received that indicates that a user has entered or left the building. The signal may be generated, for example, by an ID card reader located at an entrance to the building. In response to receiving the signal, one or more resources in the building are transitioned between a first state and a second state. When operating in the first state, the one or more resources consume relatively less power relative to when the one or more resources are operating in the second state. The approach is applicable to all types of resources, including private resources, such as personal computers, that are used primarily by the user, and shared resources, such as hallway lights and copy machines, that are used by the user and other users. Example resources include, without limitation, computers, laboratory equipment and instruments, copy machines, facsimile machines, printers, postage machines, lights and heating and air conditioning systems.

According to another aspect of the invention, a determination is made, based upon the signal and status data, whether the user has entered the building or left the building. If the user has entered the building, then the one or more resources are transitioned from the first state to the second state. If the user has left the building, then the one or more resources are transitioned from the second state to the first state.

According to a further aspect of the invention, a determination is made, based upon the signal and status data, whether the user was either the first user to enter the building or the last user to leave the building. If the user was the first user to enter the building, then one or more shared resources are transitioned from the first state to the second state. If the user was the last user to leave the building, then the one or more shared resources are transitioned from the second state to the first state.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2 is a block diagram that depicts an approach for managing power during building entry according to an embodiment of the invention;

FIG. 3 is a block diagram that depicts an approach for managing power during building exit according to an embodiment of the invention;

FIGS. 6A-6C are block diagrams that depict example implementations of data tables according to an embodiment of the invention;

FIGS. 7A and 7B are block diagrams that depict example data tables according to another embodiment of the invention.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention. Various embodiments and aspects of the invention are described hereinafter in the following sections:

I. OVERVIEW
II. POWER MANAGEMENT ARCHITECTURE
III. MANAGING POWER DURING BUILDING ENTRY AND EXIT
IV. IMPLEMENTATION MECHANISMS.

I. Overview

An approach for managing power consumption in a building includes receiving a signal that indicates that a user has entered or left the building. In response to receiving the signal, one or more resources in the building are transitioned between a first state and a second state. When operating in the first state, the one or more resources consume relatively less power relative to when the one or more resources are operating in the second state. The approach is applicable to all types of resources, including private resources that are used primarily by the user, and shared resources that are used by the user and other users. Example resources include, without limitation, computers, laboratory equipment and instruments, copy machines, facsimile machines, printers, postage machines, lights and heating and air conditioning systems.

According to one embodiment of the invention, a determination is made, based upon the signal and status data, whether the user has entered the building or left the building. If the user has entered the building, then the one or more resources are transitioned from the first state to the second state. If the user has left the building, then the one or more resources are transitioned from the second state to the first state.

According to another embodiment of the invention, a determination is made, based upon the signal and status data, whether the user was either the first user to enter the building or the last user to leave the building. If the user was the first user to enter the building, then one or more shared resources are transitioned from the first state to the second state. If the user was the last user to leave the building, then the one or more shared resources are transitioned from the second state to the first state.

II. Power Management Architecture

Figure 1:
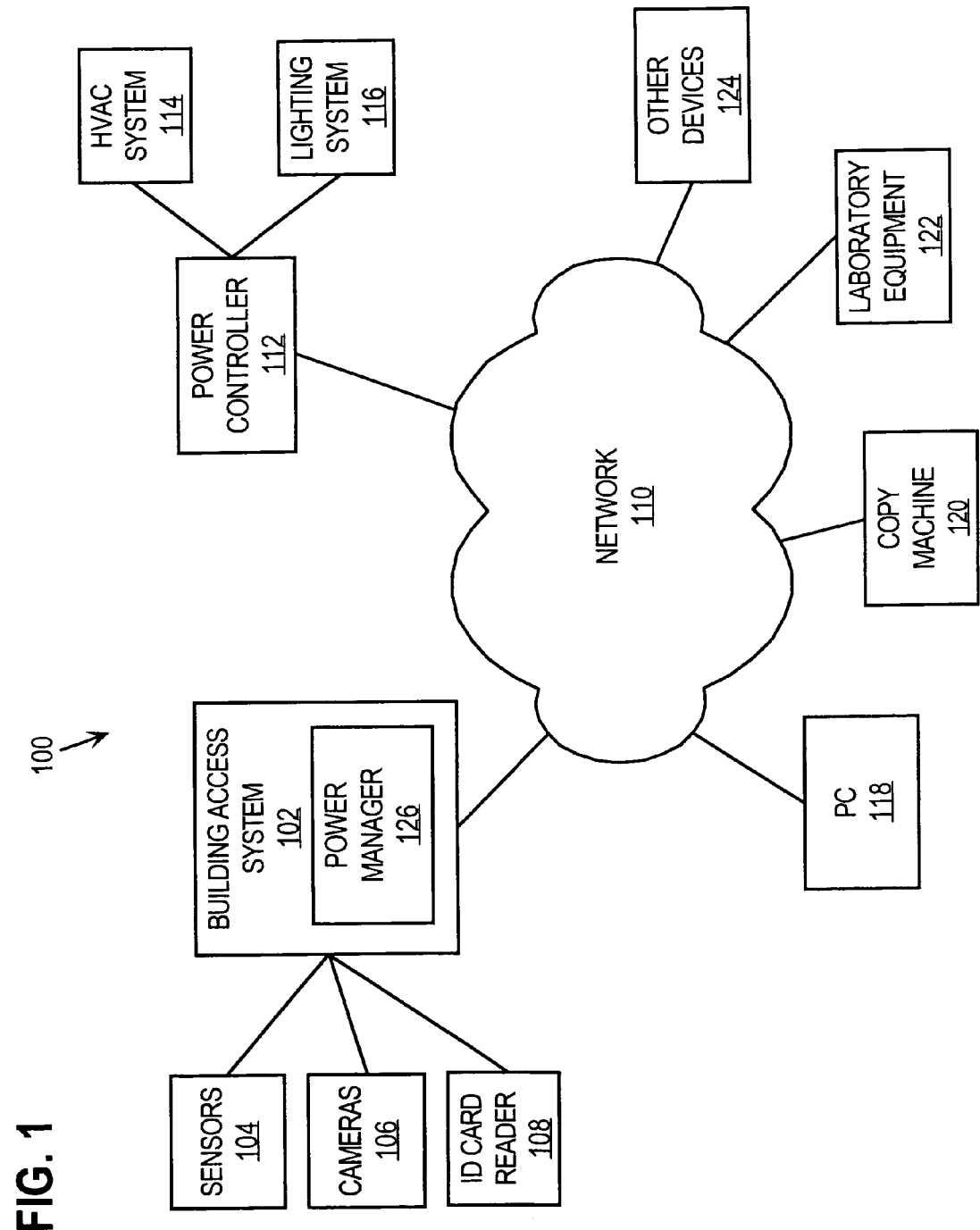
FIG. 1 is a block diagram that depicts an arrangement for managing power consumption in a building according to an embodiment of the invention.

FIG. 1 is a block diagram that depicts an arrangement for managing power consumption in a building according to an embodiment of the invention. Arrangement 100 includes a building access system 102 communicatively coupled to sensors 104, cameras 106 and an ID card reader 108.

Building access system 102 monitors and tracks individuals who enter and leave the building based upon data from sensors 104, cameras 106 and ID card reader 108. For example, access to the building may be restricted to individuals who have a valid ID card. To enter the building, an individual must first have their ID card read by ID card reader 108. ID card reader 108 provides identification data from the ID card to building access system 102 that verifies the identification data stored at the ID card against valid identification data maintained by building access system 102. If the identification data matches valid identification data maintained by building access system 102, then access to the building is granted, e.g., by unlocking a door. If the identification data does not match valid identification data maintained by building access system 102, then access to the building is denied. Building access system 102 may also maintain data that indicates dates and time of successful and unsuccessful accesses, e.g., on a non-volatile storage.

Building access system 102 is coupled to a network 110 for communicating with other elements as described hereinafter. Network 110 may be any type of medium or mechanism that provides for the exchange of data between the connected elements. Example networks include, without limitation, Local Area Networks (LANs), Wide Area Networks (WANs), the Internet, and combinations thereof, and the invention is not limited to any particular type of network or network arrangement.

Arrangement 100 also includes a power controller 112 that is communicatively coupled to and manages power for a heating ventilation air conditioning (HVAC) system 114 and a lighting system 116. Arrangement 100 further includes a personal computer (PC) 118, a copy machine 120, laboratory equipment 122 and other devices 124, that are each communicatively coupled to network 110. Arrangement 100 also includes a power manager 126 configured to manage power consumption in the building, in accordance with an embodiment of the invention.

III. Managing Power During Building Entry and Exit

FIG. 2 is a flow diagram 200 that depicts an approach for managing power during building entry according to an embodiment of the invention. In step 202, a user makes a successful entry into the building. As previously described herein, a successful entry is made when the user is identified as having the authority to enter the building. For example, the user has an identification card scanned by ID card reader 108 and verified by building access system 102.

In step 204, power manager 126 identifies private and shared resources associated with the user and retrieves status information for the identified resources. The status information indicates the current status of the identified resources, namely, whether the resources are on or off. Power manager 126 also identifies the other users associated with the same resources. Power manager 126 may maintain data that specifies associations between users and resources to enable power manager 126 to quickly determine which resources are associated with particular users. Power manager 126 may also maintain status data that indicates the current status of resources. Both types of data may be maintained by power manager 126 in local non-volatile storage, such as one or more disks, or remotely, e.g., in a remote database, as described in more detail hereinafter.

In step 206, resource manager 126 identifies which of the private and shared resources are to be activated. In general, these are the resources that the user will need. Thus, resource manager 126 identifies resources that are associated with the user that are currently off. For example, resource manager 126 may determine that private resources, such as the user's PC and office lights are currently off and will be needed by the user. As another example, resource manager 126 may determine that shared resources, such as hallway lights, copy machines, laboratory equipment, or other devices, are currently off and will be needed by the user.

In step 208, power manager 126 activates the resources. The particular actions taken to activate a resource may vary depending upon the type and attributes of the resource to be activated. For example, for some resources, such as copy machine 120, power manager 126 sends a signal to activate copy machine 120. The signal may cause copy machine 120 to transition from an off or "sleep" state to an active state. Alternatively, power manager 126 may signal another entity, such as power controller 112, to apply power to copy machine 120.

As another example, to activate the user's PC 118, power manager 126 may send a signal to a network interface card (NIC) in PC 118 to cause PC 118 to transition from an off or "sleep" state to an active state. As yet another example, resource manager 126 may send a signal to power controller 112 requesting that HVAC system 114 and lighting system 116 be activated to provide HVAC services and lighting to the physical area where the user will need those services.

In step 210, the status information is updated to reflect any changes that were made. For example, according to one embodiment of the invention, power manager 126 updates the status information stored on non-volatile storage to reflect the resources that were activated and that the user is now inside the building.

According to this approach, resources required by the user are activated when the user enters the building. This is particularly helpful in situations where resources require several minutes to be activated because the resources will be at least partially activated, and ideally fully activated, by the time the user reaches their working area.

FIG. 3 is a flow diagram 300 that depicts an approach for managing power during building exit according to an embodiment of the invention. In step 302, a user exits the building and building access system 102 is aware that the user has exited the building.

In step 304, resource manager 126 identifies private and shared resources associated with the user and retrieves status information for the identified resources. The status information indicates the current status of the identified resources, namely, whether the resources are currently on or off. Power manager 126 also identifies the other users associated with the same resources.

In step 306, resource manager 126 identifies which of the private and shared resources are to be de-activated. In general, these are the resources that the user will no longer need to use. Thus, resource manager 126 identifies private resources that are associated with the user that are currently on and should be turned off. For example, resource manager 126 may determine that the user's PC and office lights (private resources) are currently on. For shared resources, resource manager 126 examines the status information to identify shared resources that are both associated with the user and no longer needed by the user or any other users. For example, resource manager 126 may determine that hallway lights, a copy machine, laboratory equipment, or other devices (shared resources) are currently on and that the user is the last user in the building associated with these shared resources. These resources are identified for de-activation. Shared resources that are associated with both the user and at least one other user that is still in the building are not selected for de-activation.

In step 308, resource manager 126 de-activates the identified resources. The steps required to de-activate a particular resource may vary from resource to resource. For example, to de-activate HVAC system 114 and lighting system 116, resource manager 126 sends a signal to power controller 112 requesting that power controller 112 de-activate HVAC system 114 and lighting system 116. For other devices, such as PC 118 or copy machine 120, currently-executing processes are permitted to finish processing before the devices are de-activated. For example, to de-activate copy machine 120, power manager 126 sends a command to copy machine 120. Copy machine 120 finishes processing any current copy jobs and then enters the off or "sleep" state.

As another example, power manager 126 may send a de-activate or "sleep" command to PC 118, e.g., to a network interface card (NIC) in PC 118, which queues the command until processes that are currently executing are completed. Once those processes have completed their processing, the NIC causes PC 118 to enter an off or "sleep" state. These steps may be performed, for example, by an application executing on PC 118 or by an operating system function. Alternatively, if power manager 126 is aware of the processes executing on PC 118, then power manager 126 may cause the termination of those processes remotely and then issue the off or "sleep" command to PC 118. The processes may be closed simultaneously or one by one, depending upon the type of PC 118 and processes.

Figure 4:
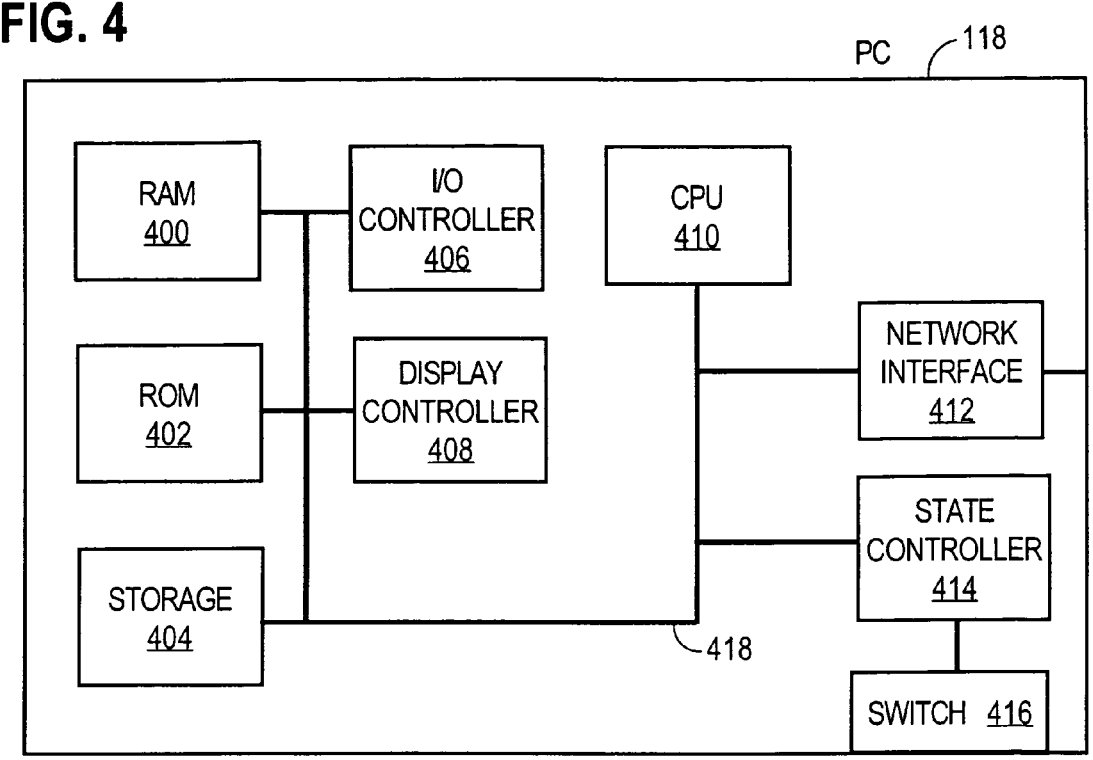
FIG. 4 is a block diagram that depicts an example implementation of a personal computer configured in accordance with an embodiment of the invention.

FIG. 4 is a block diagram that depicts an example implementation of PC 118. In this example, PC 118 includes a random access memory (RAM) 400, a read-only memory (ROM) 402 and storage 404, such as one or more disks, optical disks, flash memories, tape drives, or a combination thereof. PC 118 also includes an input/output (I/O) controller 406, a display controller 408, a central processing unit (CPU) 410, a network interface 412, a state controller 414 and a switch 416. All of these components, except for switch 416, are communicatively coupled to each other via a bus 418. Switch 416 is manually accessible and allows a user to manually change the state of PC 118, e.g., between off and on states.

In operation, network interface 412 is configured to receive external signals, e.g., state change signals from power manager 126, and provide those signals to state controller 414 via bus 418. State controller 414 controls the state of PC 118. For example, power manager 126 issues a "sleep" command to PC 118 that is received by network interface 412. Network interface 412 provides the "sleep" command to state controller 414, which causes PC 118 to enter the "sleep" state. In the "sleep" state, PC 118 consumes relatively less power than when operating in the active or fully "on" state. As described herein, one or more processes that are executing at the time the "sleep" command is received by PC 118 are shut down before PC 118 is put into the "sleep" state.

In step 310, the status information is updated to reflect any changes that were made. For example, according to one embodiment of the invention, power manager 126 updates the status information stored on non-volatile storage to reflect the resources that were de-activated and that the user is now outside the building.

According to this approach, private resources required by the user are de-activated when the user exits the building. Also, shared resources that are no longer required by the user or any other users are also de-activated. This provides a significant reduction in the amount of power consumed by the private and shared resources, since they are de-activated when the users that require those resources exit the building.

IV. Implementation Mechanisms

Figure 5:
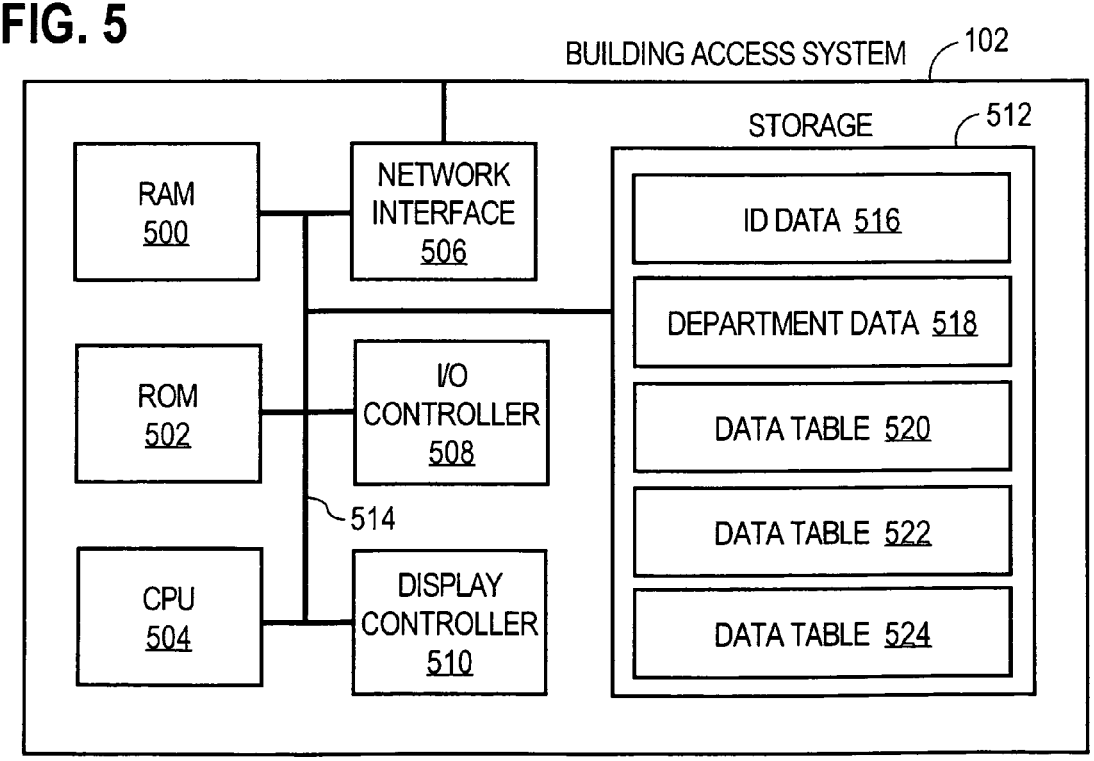
FIG. 5 is a block diagram that depicts an example implementation of building access system, in accordance with an embodiment of the invention.

FIG. 5 is a block diagram that depicts an example implementation of building access system 102. In this example, building access system 102 includes a RAM 500, a ROM 502, a CPU 504, a network interface 506, an I/O controller 508, a display controller 510 and a storage 512 that are communicatively coupled to each other via a bus 514. In this example, power manager 126 and the building access functions are implemented as processes executed by CPU 504. The instructions executed by CPU 504 to perform these functions may be stored in RAM 500, ROM 502, storage 512, or any combination thereof.

Storage 512 may be implemented by any type of storage mechanism, such as one or more hard disks, optical disks, flash memories, tape drives, or a combination thereof, and the invention is not limited to any particular implementation. In the present example, storage 512 includes ID data 516, department data 518 and data tables 520, 522, 524. ID data 516 includes user identification data that specifies valid user IDs that may be used by building access system 102 to determine whether to allow users to access to the building. The user IDs are also used by power manager 126 as described herein to manage power consumption. Department data 518 is data that specifies a logical group within a building or organization, i.e., a department of a corporation, and the users that are members of the logical group.

Data tables 520, 522, 524 contain data that is used to manage power consumption as described herein. FIGS. 6A-6C are block diagrams that depict example implementations of data tables 520, 522, 524, according to an embodiment of the invention. In FIG. 6A, data table 520 is implemented as a table with a column 600 that contains user IDs and a column 602 that specifies private resources, in this example a vector of lights, associated with each user ID. In FIG. 6B, data table 522 is implemented as a table with a column 604 that contains user IDs and a column 606 that specifies private resources, in this example a vector of peripherals, associated with each user ID. In FIG. 6C, data table 524 is implemented as a table with a column 608 that contains user IDs, a column 610 that specifies a vector of PCs and status for each user ID in Column 606, a user status column 612 that specifies whether the user is in or out of the building and a department column 614 that specifies a logical group, in this example a department, with which the user is associated.

FIGS. 7A and 7B are block diagrams that depict example data tables 700, 708 that may be maintained on storage 512 according to an embodiment of the invention. In this example, data tables 700, 708 contain shared resource information used by power manager 126 to manage power in the building. For example, data table 700 includes a department column 702 that specifies a particular department, a vector of lights column 704 that stores a vector of lights associated with each department in column 702 and a vector of IDs column 706 that stores a vector of user IDs associated with each department in column 702. As another example, in FIG. 7B, data table 708 includes a department column 710 that specifies a particular department, a vector of peripherals column 712 that stores a vector of peripherals associated with each department in column 710, and a vector of IDs column 714 that stores a vector of user IDs associated with each department in column 710.

Although FIGS. 6A-6C, 7A and 7B depict specific examples of data maintained on storage 512, the invention is not limited to these particular examples, and any type of data may be stored depending upon the requirements of a particular application.

Figure 8:
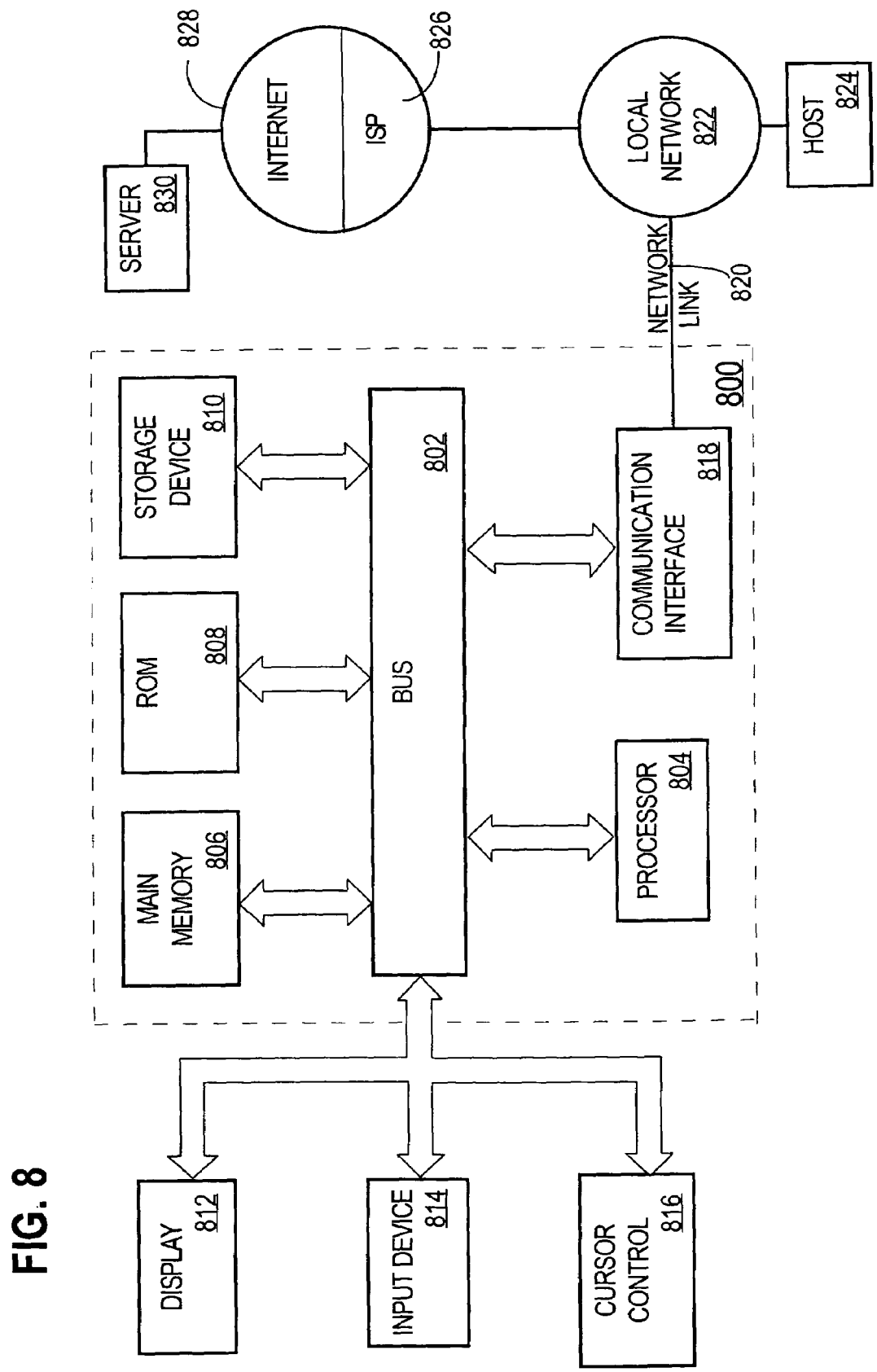
FIG. 8 is a block diagram of a computer system on which embodiments of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for managing power consumption in buildings. According to one embodiment of the invention, the management of power consumption in buildings is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for the management of power consumption in buildings as described herein.

The received code may be executed by processor 804 as it is received, and/or stored in storage device 810, or other non-volatile storage for later execution. In this manner, computer system 800 may obtain application code in the form of a carrier wave.

Although embodiments of the invention have been described herein primarily in the context of managing power consumption in buildings, the approach is not limited to office buildings and is applicable to any type of structure or arrangement. For example, the approach is applicable to managing power consumption in office buildings, apartment buildings and homes. Also, although embodiments of the invention have been described herein primarily in the context of managing power consumption in buildings upon entry and exit to a building, the approach is also applicable to entry and exit to different portions of a building or complex. For example, the approach is applicable to situations where a user has entered a portion of a building or complex that the user was not in, or left a portion of a building or complex for at least a specified period of time. This may be implemented, for example, in situations where a user is required to present for verification an ID card to move between the different portions of the building or complex, e.g., via internal doors, hallways, causeways, etc., so that the movement can be detected and tracked. The approach is also applicable to situations where user identification is checked at a location external to a building, for example at a guard house or surrounding gate.

Power manager 126 may be implemented in hardware, computer software, or a combination of hardware and computer software and the invention is not limited to any particular implementation. Furthermore, although embodiments of the invention have been described in the context of power manager 126 being implemented as part of building access system 102, the invention is not limited to this implementation. The approach may be implemented in any of the other components in arrangement 100. Alternatively, the approach may be implemented as a stand-alone mechanism that interacts with the various components of arrangement 100.

The approach described herein for managing power in buildings reduces the amount of power consumed by resources, while reducing the amount of time that users have to wait for resources to power up when they enter a building.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for managing resources in a building, the computer-implemented method comprising:
    receiving a data signal that indicates that a user has entered the building; and
    in response to receiving a data signal that indicates that a user has entered the building;
        identifying a first set of one or more resources that are disposed in the building and associated with only the user;
        causing the first set of one or more resources that are disposed in the building and associated with only the user to be activated;
        identifying a second set of one or more resources that are disposed in the building and associated with a logical group that includes as members both the user and one or more other users; and
        causing the second set of one or more resources that are disposed in the building and associated with the logical group that includes as members both the user and the one or more other users to be activated.

2. The computer-implemented method as recited in claim 1, wherein causing the first set of one or more resources to be activated includes causing the first set of one or more resources to transition from a low power state to a higher power state, wherein the set of one or more resources consume relatively more power when operating in the higher power state compared to when the first set of one or more resources are operating in the lower power state.

3. The computer-implemented method as recited in claim 1, wherein causing the second set of one or more resources to be activated includes causing the second set of one or more resources to transition from a low power state to a higher power state, wherein the set of one or more resources consume relatively more power when operating in the higher power state compared to when the second set of one or more resources are operating in the lower power state.

4. The computer-implemented method as recited in claim 1, wherein the second set of one or more resources includes a lighting system.

5. The computer-implemented method as recited in claim 1, wherein the second set of one or more resources includes a heating/cooling system.

6. The computer-implemented method as recited in claim 1, wherein the second set of one or more resources includes a computer.

7. The computer-implemented method as recited in claim 1, wherein the first set of one or more resources includes a computer.

8. The computer-implemented method as recited in claim 1, wherein the data signal is generated in response to detecting an identifier that identifies the user.

9. The computer-implemented method as recited in claim 1, wherein the signal is generated in response to detecting an identifier that uniquely identifies the particular user.

10. A computer-readable medium for managing resources in a building, the computer-readable medium carrying instructions which, when processed by one or more processors, cause:
- receiving a data signal that indicates that a user has entered the building; and
- in response to receiving a data signal that indicates that a user has entered the building;
  - identifying a first set of one or more resources that are disposed in the building and associated with only the user;
  - causing the first set of one or more resources that are disposed in the building and associated with only the user to be activated;
  - identifying a second set of one or more resources that are disposed in the building and associated with a logical group that includes as members both the user and one or more other users; and
  - causing the second set of one or more resources that are disposed in the building and associated with the logical group that includes as members both the user and the one or more other users to be activated.

11. The computer-readable medium as recited in claim 10, wherein causing the first set of one or more resources to be activated includes causing the first set of one or more resources to transition from a low power state to a higher power state, wherein the set of one or more resources consume relatively more power when operating in the higher power state compared to when the first set of one or more resources are operating in the lower power state.

12. The computer-readable medium as recited in claim 10, wherein causing the second set of one or more resources to be activated includes causing the second set of one or more resources to transition from a low power state to a higher power state, wherein the set of one or more resources consume relatively more power when operating in the higher power state compared to when the second set of one or more resources are operating in the lower power state.

13. The computer-readable medium as recited in claim 10, wherein the second set of one or more resources includes a lighting system.

14. The computer-readable medium as recited in claim 10, wherein the second set of one or more resources includes a heating/cooling system.

15. The computer-readable medium as recited in claim 10, wherein the second set of one or more resources includes a computer.

16. The computer-readable medium as recited in claim 10, wherein the first set of one or more resources includes a computer.

17. The computer-readable medium as recited in claim 10, wherein the data signal is generated in response to detecting an identifier that identifies the user.

18. The computer-readable medium as recited in claim 10, wherein the signal is generated in response to detecting an identifier that uniquely identifies the particular user.

19. An apparatus for managing resources in a building, the apparatus comprising a memory storing instructions which, when processed by one or more processors, cause:
- receiving a data signal that indicates that a user has entered the building; and
- in response to receiving a data signal that indicates that a user has entered the building;
  - identifying a first set of one or more resources that are disposed in the building and associated with only the user;
  - causing the first set of one or more resources that are disposed in the building and associated with only the user to be activated;
  - identifying a second set of one or more resources that are disposed in the building and associated with a logical group that includes as members both the user and one or more other users; and
  - causing the second set of one or more resources that are disposed in the building and associated with the logical group that includes as members both the user and the one or more other users to be activated.

20. The apparatus as recited in claim 19, wherein causing the first set of one or more resources to be activated includes causing the first set of one or more resources to transition from a low power state to a higher power state, wherein the set of one or more resources consume relatively more power when operating in the higher power state compared to when the first set of one or more resources are operating in the lower power state.

21. The apparatus as recited in claim 19, wherein causing the second set of one or more resources to be activated includes causing the second set of one or more resources to transition from a low power state to a higher power state, wherein the set of one or more resources consume relatively more power when operating in the higher power state compared to when the second set of one or more resources are operating in the lower power state.

22. The apparatus as recited in claim 19, wherein the second set of one or more resources includes a lighting system.

23. The apparatus as recited in claim 19, wherein the second set of one or more resources includes a heating/cooling system.

24. The apparatus as recited in claim 19, wherein the second set of one or more resources includes a computer.

25. The apparatus as recited in claim 19, wherein the first set of one or more resources includes a computer.

26. The apparatus as recited in claim 19, wherein the data signal is generated in response to detecting an identifier that identifies the user.

27. The apparatus as recited in claim 19, wherein the signal is generated in response to detecting an identifier that uniquely identifies the particular user.

* * * * *